(12) United States Patent
Kesavan et al.

(10) Patent No.: US 10,210,056 B2
(45) Date of Patent: Feb. 19, 2019

(54) METHODS FOR FILESYSTEM METADATA CACHING TO IMPROVE FAILOVER PERFORMANCE AND DEVICES THEREOF

(71) Applicant: NetApp, Inc., Sunnyvale, CA (US)

(72) Inventors: Ram Kesavan, Bangalore (IN); Ananthan Subramanian, San Ramon, CA (US); Aziz Gulbeden, Cary, NC (US); Christian Compton, Cary, NC (US); Jawahar Tadipatri, Cary, NC (US); Bipin Tomar, Morrisville, NC (US); Joseph Allen Brown, Jr., Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 15/087,401

(22) Filed: Mar. 31, 2016

(65) Prior Publication Data

US 2017/0286238 A1 Oct. 5, 2017

(51) Int. Cl.
*G06F 11/16* (2006.01)
*G06F 11/20* (2006.01)
*G06F 17/30* (2006.01)
*G06F 12/0802* (2016.01)

(52) U.S. Cl.
CPC ...... *G06F 11/1662* (2013.01); *G06F 11/1666* (2013.01); *G06F 12/0802* (2013.01); *G06F 17/3012* (2013.01); *G06F 17/30194* (2013.01); *G06F 11/20* (2013.01); *G06F 2212/1032* (2013.01); *G06F 2212/2024* (2013.01)

(58) Field of Classification Search
CPC ............ G06F 11/1662; G06F 17/3012; G06F 17/3019; G06F 12/0802; G06F 11/1666; G06F 11/20; G06F 2212/2024; G06F 2212/1032
See application file for complete search history.

(56) References Cited

U.S. PATENT DOCUMENTS

| 8,862,808 | B2 * | 10/2014 | Tsukamoto | G06F 1/30 711/103 |
| 8,898,388 | B1 * | 11/2014 | Kimmel | G06F 12/0802 711/103 |
| 9,026,741 | B1 * | 5/2015 | Derbeko | G06F 11/2017 711/122 |
| 9,378,141 | B1 * | 6/2016 | Thukral | H04L 67/2842 |
| 9,632,932 | B1 * | 4/2017 | Sutardja | G06F 12/0806 |
| 9,916,241 | B2 * | 3/2018 | McKean | G06F 12/0804 |
| 2013/0019067 | A1 * | 1/2013 | Vilayannur | G06F 12/08 711/144 |

(Continued)

*Primary Examiner* — Paul Contino
(74) *Attorney, Agent, or Firm* — LeClairRyan PLLC

(57) ABSTRACT

A method, non-transitory computer readable medium, and device that assists with caching filesystem metadata to a partner non-volatile random-access memory (NVRAM) includes caching metadata related to an incoming data modifying operation generated by a client computing device to at least one storage controller device in a cluster. A service interruption event that makes a data block present in the storage device of a hosting storage node inaccessible to the client computing device is determined for during the caching. The requested metadata block from the at least one NVRAM is retrieved when the service interruption event is determined. The cache is warmed using the retrieved metadata block from the at least one NVRAM.

18 Claims, 3 Drawing Sheets

(56) References Cited

U.S. PATENT DOCUMENTS

| | | | |
|---|---|---|---|
| 2013/0254457 A1* | 9/2013 | Mukker | G06F 11/1441 |
| | | | 711/103 |
| 2014/0032595 A1* | 1/2014 | Makkar | G06F 17/30557 |
| | | | 707/770 |
| 2014/0047263 A1* | 2/2014 | Coatney | G06F 11/2023 |
| | | | 714/4.11 |
| 2014/0281131 A1* | 9/2014 | Joshi | G06F 12/0804 |
| | | | 711/103 |
| 2014/0298078 A1* | 10/2014 | Keremane | H04L 67/06 |
| | | | 714/4.1 |
| 2015/0154087 A1* | 6/2015 | Jin | G06F 3/0619 |
| | | | 711/154 |
| 2016/0350028 A1* | 12/2016 | Lesartre | G06F 12/08 |
| 2017/0046259 A1* | 2/2017 | McKean | G06F 12/0804 |
| 2017/0123946 A1* | 5/2017 | Wu | G06F 11/2094 |

* cited by examiner

METHODS FOR FILESYSTEM METADATA CACHING TO IMPROVE FAILOVER PERFORMANCE AND DEVICES THEREOF

FIELD

This technology generally relates to data storage management and, more particularly, methods for filesystem metadata caching to improve failover performance and devices thereof.

BACKGROUND

Traditional data storage controller devices can store data redundantly, across multiple data storage devices. A data storage controller device may employ various forms of data storage devices, e.g., hard disk drives, solid state drives, tape devices, etc. The data storage devices are typically implemented as one or more storage volumes that comprise a cluster of data storage devices, in which the volumes define an overall logical arrangement of storage space. To improve performance, these data storage controllers can temporarily store various data storage commands they receive from client computing devices in a region of local system memory and/or the system memory of other storage controllers that it can communicate with within a cluster. However, the data in system memory is volatile and can be lost before the data gets stored persistently to the data storage devices, e.g. in case of a power failure. To reduce the likelihood of data loss in such circumstances, the storage controller may also store the data in non-volatile random access memory (NVRAM), typically in form of a log file or a journal. By logging the incoming data modifying operations in NVRAM, the storage controller is able to immediately return the acknowledgement back to the client computing devices rather than wait for the operation to persistently make it to the slower data storage devices.

NVRAM log file can accumulate storage operations until a consistency point (CP) is triggered. CP's are triggered at specific time intervals or at specific events (e.g. NVRAM is almost full). At each CP the data is committed from the storage controller system memory to underlying data storage and the NVRAM is cleared of the log of temporary data modifying commands.

Typically the nodes in the cluster are also paired to form high-availability (HA-pair) zones, such that during normal operation each node in an HA-pair mirrors the NVRAM operations to its respective partner. If one node in a HA-pair gets interrupted unexpectedly, e.g., because of power failure or other problems, the system is able to recover generally by having the failing node's HA-partner taking over its storage devices, committing the temporarily staged data operations in NVRAM to the persistent storage devices (also referred to as "replay of NVRAM log") and start serving the data owned by the failing node. In case where there is no partner node, the failing node reboots and performs the same tasks including replay of NVRAM log before it can start serving the data again.

However, while the partner node is taking over the failed node and is in process of committing or replaying NVRAM log, the partner node may need to warm its cache by accessing and retrieving some metadata (related to journaled operations) from the persistent storage devices (typically hard disks) of the failed storage controller which can be orders of magnitude slow. As a result, client devices can experience a significant and noticeable outage window during which requested data or the files in the failed storage node are inaccessible. With technological advances, the higher NVRAM size have become more prevalent causing undesirable increase in the time it takes to replay the NVRAM log thereby leading to higher recovery times.

DETAILED DESCRIPTION

Figure 1:
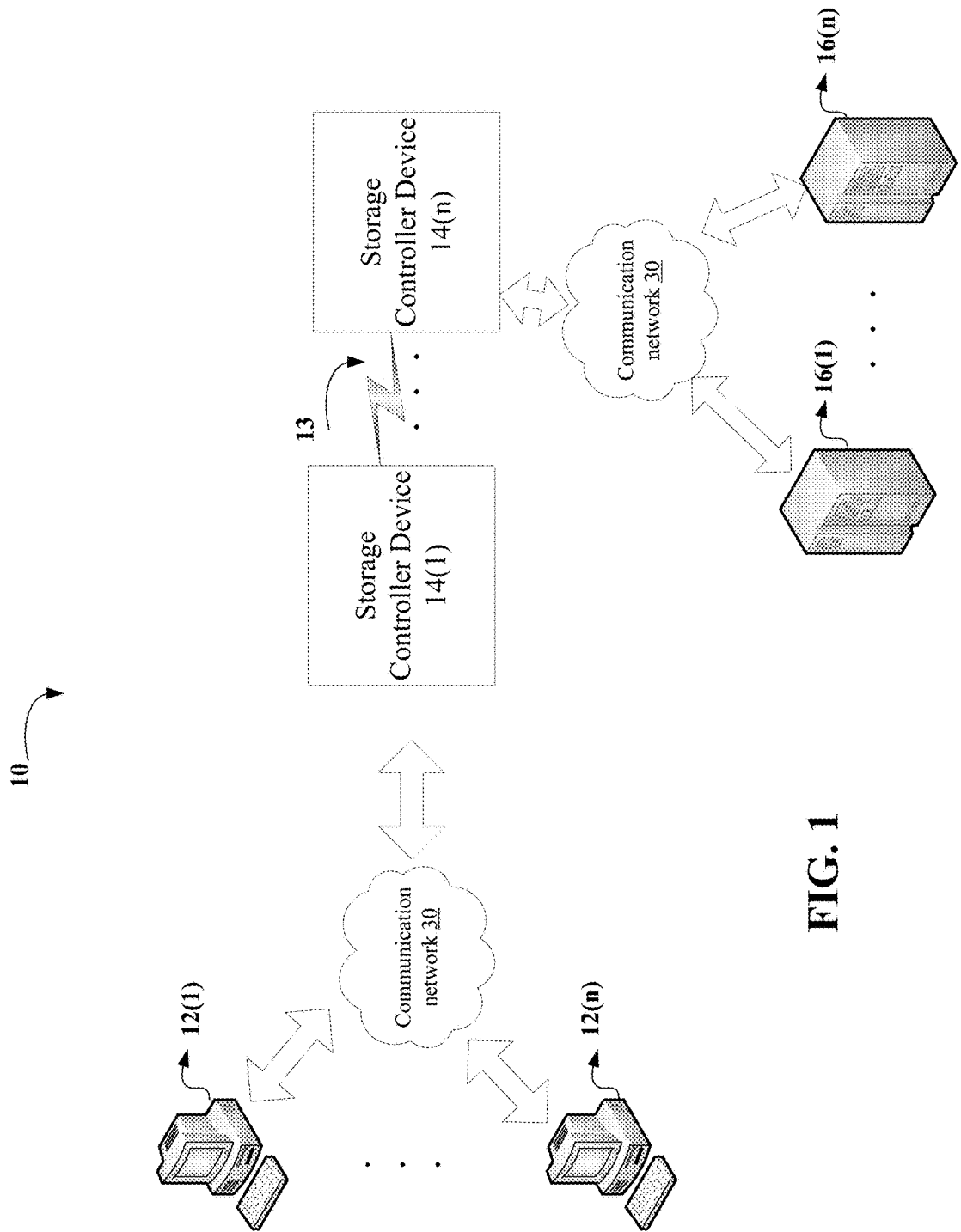
FIG. 1 is a block diagram of an environment with plurality of storage controllers.

An environment 10 with a plurality of client computing devices 12(1)-12(n), an exemplary plurality of storage controller devices 14(1)-14(n), a plurality of storage devices 16(1)-16(n) is illustrated in FIG. 1. In this particular example, the environment 10 in FIG. 1 includes the plurality of client computing devices 12(1)-12(n), the plurality of storage controller devices 14(1)-14(n) and a plurality of storage devices 16(1)-16(n) coupled via one or more communication networks 30, although the environment could include other types and numbers of systems, devices, components, and/or other elements. The example of a method for caching of metadata to the system memory (NVRAM or DRAM) of the same or different node within the storage cluster is executed by the plurality of storage controller devices 14(1)-14(n), although the approaches illustrated and described herein could be executed by other systems and devices. The environment 10 may include other types and numbers of other network elements and devices, as is generally known in the art and will not be illustrated or described herein. This technology provides a number of advantages including providing methods, non-transitory computer readable media and devices for caching of filesystem metadata to system memory (NVRAM/DRAM).

Figure 2:
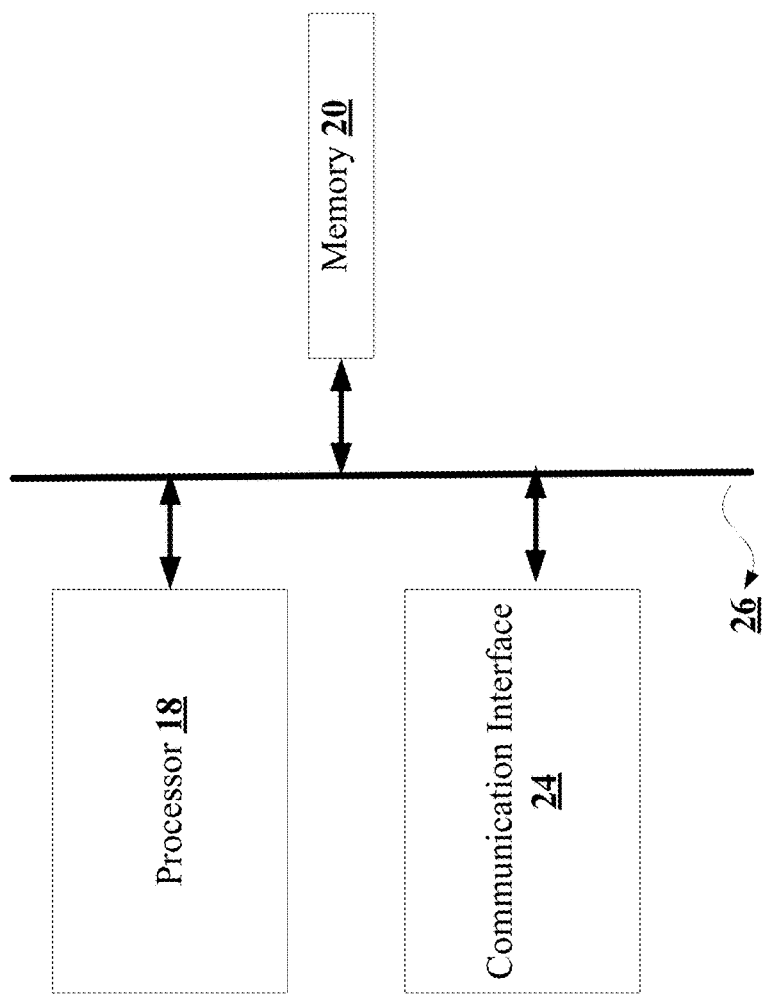
FIG. 2 is a block diagram of the exemplary storage controller in FIG. 1.

Referring to FIG. 2, in this example each of the plurality of storage controller devices 14(1)-14(n) includes a processor 18, a memory 20, and a communication interface 24 which are coupled together by a bus 26, although the plurality of storage controller devices 14(1)-14(n) may include other types and numbers of elements in other configurations. In this example, one or more of the plurality of storage controller devices 14(1)-14(n) can be configured to be a hosting storage node, and one or more of the plurality of storage controller devices 14(1)-14(n) can be configured to be a partner storage node. Further in this example, each of the hosting storage nodes has at least one corresponding partner storage node that would assist with mirroring of data and/or data operations performed on the hosting storage node.

The processor 18 of each of the plurality of storage controller devices 14(1)-14(n) may execute one or more programmed instructions stored in the memory 20 for caching of filesystem metadata to the local system memory (NVRAM) or to the partner storage node system memory (NVRAM/DRAM) as illustrated and described in the examples herein, although other types and numbers of functions and/or other operation can be performed. The processor 18 of the plurality of storage controller devices 14(1)-14(n) may include one or more central processing units ("CPUs") or general purpose processors with one or more processing cores, such as AMD® processor(s), although other types of processor(s) could be used (e.g., Intel®).

The memory 20 of each of the plurality of storage controller devices 14(1)-14(n) stores the programmed instructions and other data for one or more aspects of the present technology as described and illustrated herein, although some or all of the programmed instructions could be stored and executed elsewhere. A variety of different types of memory storage devices, such as a non-volatile memory (NVRAM), random access memory (DRAM) or other reading and writing system that is coupled to the processor 18, can be used for the memory 20. In this example, the memory 20 of each of the plurality of storage controller devices 14(1)-14(n) includes both NVRAM and DRAM, with the NVRAM size sufficiently large to log a specified number of transactions (e.g., several seconds' or minutes' worth of data at expected storage throughput).

The communication interface 24 of each of the plurality of storage controller devices 14(1)-14(n) operatively couples and communicates with the plurality of client computing devices 12(1)-12(n) and the plurality of storage devices 16(1)-16(n), which are all coupled together by the communication network 30, although other types and numbers of communication networks or systems with other types and numbers of connections and configurations to other devices and elements. By way of example only, the communication network 30 can use TCP/IP over Ethernet and industry-standard protocols, including NFS, CIFS, SOAP, XML, LDAP, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. In this example, the bus 26 is a universal serial bus, although other bus types and links may be used, such as PCI-Express or hyper-transport bus. Additionally in this example, each of the plurality of storage controller devices 14(1)-14(n) can communicate with each other via a dedicated communication channel 13 that can either we a WAN, LAN or a fiber optic channel. Alternatively in another example, the dedicated communication channel 13 can be the communication network 30 illustrated above.

Each of the plurality of client computing devices 12(1)-12(n) includes a central processing unit (CPU) or processor, a memory, and an I/O system, which are coupled together by a bus or other link, although other numbers and types of network devices could be used. The plurality of client computing devices 12(1)-12(n) communicates with the plurality of storage controller devices 14(1)-14(n) to request or modify block storage in the plurality of storage devices 16(1)-16(n), although the client computing devices 12(1)-12(n) can interact with the plurality of storage controller devices 14(1)-14(n) for other purposes. By way of example, the plurality of client computing devices 12(1)-12(n) may run application(s) that may provide an interface to make requests to access, modify, delete, edit, read or write data within plurality of storage controller devices 14(1)-14(n) or the plurality of storage devices 16(1)-16(n) via the communication network 30.

Each of the plurality of storage devices 16(1)-16(n) includes a central processing unit (CPU) or processor, and an I/O system, which are coupled together by a bus or other link, although other numbers and types of network devices could be used. Various network processing applications, such as CIFS applications, NFS applications, HTTP Web Data storage device applications, and/or FTP applications, may be operating on the plurality of storage devices 16(1)-16(n) and transmitting data (e.g., files or web pages) in response to requests from the plurality of storage controller devices 14(1)-14(n) and the plurality of client computing devices 12(1)-12(n). It is to be understood that the plurality of storage devices 16(1)-16(n) may be hardware (for example, HDD) or may represent a system with multiple external resource servers, which may include internal or external networks.

Although the exemplary network environment 10 includes the plurality of client computing devices 12(1)-12(n), the plurality of storage controller devices 14(1)-14(n), and the plurality of storage devices 16(1)-16(n) described and illustrated herein, other types and numbers of systems, devices, components, and/or other elements in other topologies can be used. It is to be understood that the systems of the examples described herein are for exemplary purposes, as many variations of the specific hardware and software used to implement the examples are possible, as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 3:
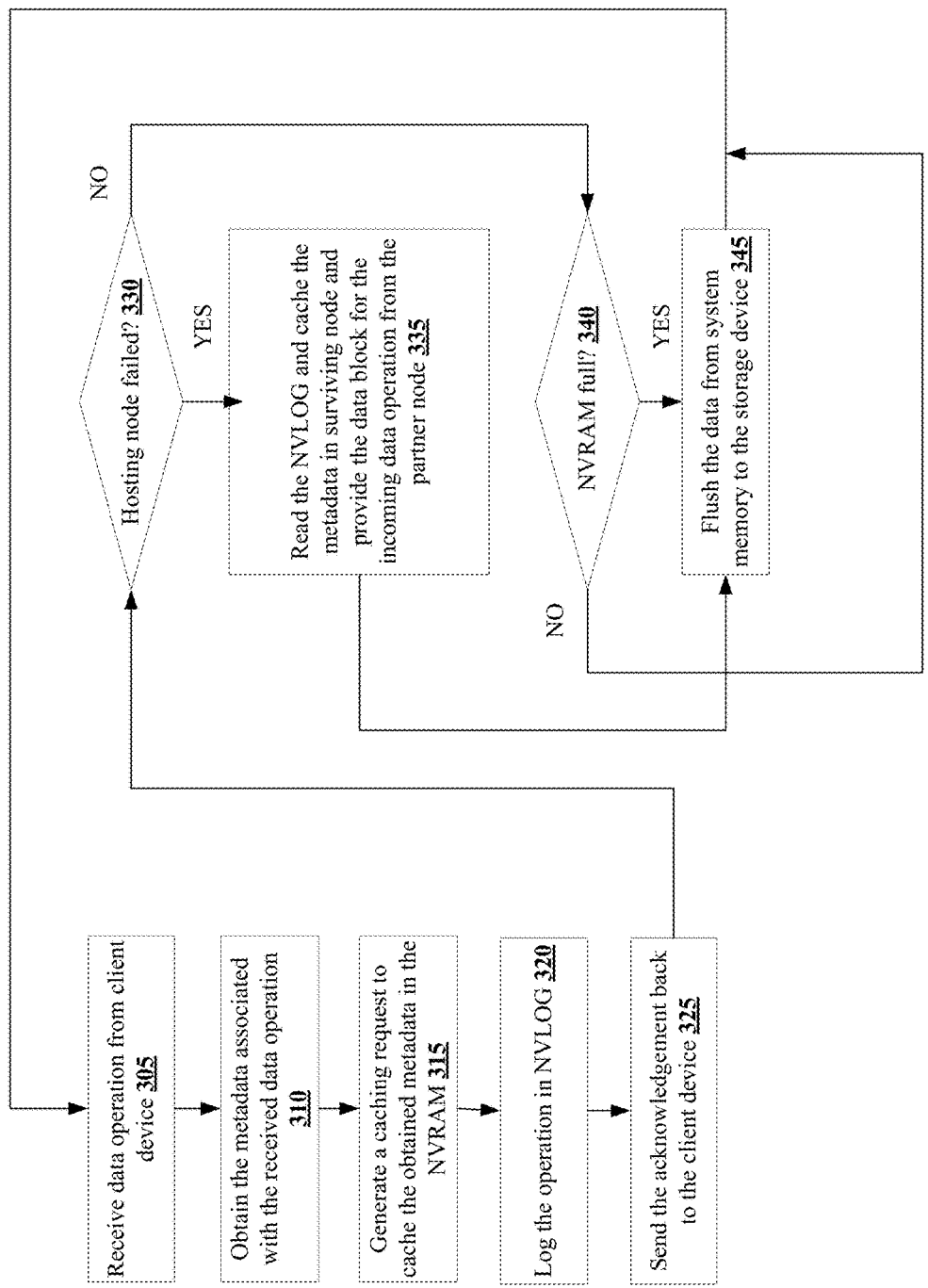
FIG. 3 is a flow chart of an example of a method for mirroring filesystem metadata to a non-volatile random-access memory (NVRAM) of another node in a cluster.

An example of a method for caching of filesystem metadata to system memory (NVRAM/DRAM) will now be described herein with reference to FIGS. 1-3. The exemplary method begins at step 305 where one of the plurality of storage controller devices 14(1)-14(n) receives a data modifying operation for the data present in one of the plurality of storage devices 16(1)-16(n) from one of the plurality of client computing devices 12(1)-12(n), although the plurality of storage controller devices 14(1)-14(n) can receive other types and/or numbers of operations. In this example, the receiving one of the plurality of storage controller devices 14(1)-14(n) will be called as the hosting storage node for purpose of further illustration. Additionally as illustrated above, the hosting storage node may have at least one partner storage node (one or more of the plurality of storage controller devices 14(1)-14(n)) to provide high-availability in case of a node failure, although the partner storage node can be used for other types or amounts of functions.

Next in step 310, the hosting storage node which is one of the plurality of storage controller devices 14(1)-14(n)

obtains the metadata for one of the files from the memory 20 based on the received data modifying operation, although the hosting storage node can obtain the metadata from other memory locations such as the plurality of storage devices 16(1)-(n). In this example, the metadata relates to the information associated with the data block on which the data modifying operation is being performed, although the metadata can also include the data block and the information associated with the data block, in other examples.

Next in step 315, the hosting storage node which is one of the plurality of storage controller devices 14(1)-14(n) generates a caching request to cache the obtained metadata to the NVRAM/DRAM of the partner node when it is available, or to the local NVRAM of the hosting storage node. Additionally in this example, the plurality of storage controller devices 14(1)-14(n) assists with mirroring of the data operation performed on a hosting storage node onto the NVRAM or the DRAM of the partner storage node in real-time, although the data operation can be mirrored at other locations on other devices. Alternatively, the plurality of storage controller devices 14(1)-14(n) can assist the hosting storage node to cache the metadata, to the NVRAM of the hosting storage node or onto the partner storage node, by way of example.

In step 320, the hosting storage node logs the received data modifying operation into NVRAM log (NVLOG) file or a journal present in a NVRAM of hosting storage node on which the data modifying operation is required to be performed, although the hosting storage node can log the information at other locations. In this example, the NVLOG includes the data modifying operations, such as write operation stored in sequential order by way of example, although the NVLOG can include other types and/or amounts of information stored in other sequencing orders. By using the operations logged in NVLOG, the plurality of storage controller devices 14(1)-14(n) can assist in recovery from an unexpected service interruption such as a power failure.

In step 325, the hosting storage node sends an acknowledgement back to the requesting one of the plurality of client computing devices 12(1)-12(n) confirming the receipt of the data modifying operation. In this example, the received data modifying operation is logged into the NVLOG before an acknowledgment is returned to the requesting one of the plurality of client computing devices 12(1)-12(n). Alternatively in another example, the data modifying operation can also be transferred to one of the plurality of storage devices 16(1)-16(n) in the background upon the completion of the logging. Using this method, the technology is able to significantly reduce the waiting time for the requesting one of the plurality of client computing devices 12(1)-12(n) when compared to the traditional techniques that requires the received data operation to be stored in the plurality of persistent storage devices 16(1)-16(n) which is a time consuming process and then send the acknowledgement to the requesting client computing device.

Next in step 330, the hosting storage node that is currently assisting with performing the data modifying operation determines when there is a service interruption event, such as an unexpected failure or ungraceful shutdown by way of example only. While the exemplary illustration of the technology includes the step 330 to be performed after step 325, step 330 that illustrates determining when the hosting storage node fails can continue to happen in parallel to the other steps illustrated in the exemplary flowchart of FIG. 3. In this example due to the service interruption event, the data blocks that were being provided through the hosting storage node may be inaccessible to the requesting one of the plurality of client computing devices 12(1)-12(n). By way of example only, the failed hosting storage node sends a notification to the partner storage node at the time of the service interruption event, although the hosting or partner storage node can use other techniques to determine when a service interruption event has occurred. As illustrated earlier, the partner storage node is one or more of the plurality of storage controller devices 14(1)-14(n) that is used to provide high-availability in case of a node failure, although the partner storage node can be used for other types or amounts of functions. By way of example only, a service interruption event such as an unexpected failure may relate to failure in the hosting storage node due to loss of power or an ungraceful shutdown or relate to a powering off of the hosting storage node due to a corrupt data block or data operation, although again there may be other types and/or numbers of service interruption events. Accordingly, when the hosting storage node determines that there is a service interruption event that has occurred, then the Yes branch is taken to step 335.

Next in step 335, the partner storage node which is one of the plurality of storage controller devices 14(1)-14(n) starts the NVLOG replay operation by reading out the logged data operations from the partner section of its own NVRAM which is where the failed node was mirroring both the metadata and the data modifying operations during normal execution. The partner storage node which is taking over the failed node, additionally reads out the mirrored metadata associated with the corresponding data modifying operation to warm its cache, although the partner storage node can obtain the metadata from other locations such as the plurality of storage devices 16(1)-16(n). By reading the mirrored metadata from the system memory (for e.g. DRAM or NVRAM), the technology is able to significantly reduce the outage window during which the requested data storage may not be available to the requesting one of the plurality of client computing devices 12(1)-12(n).

However back in step 330, when the hosting storage node has determined that service interruption event has not occurred, then the No branch is taken to step 340. In step 340, the hosting storage node determines if a consistency point (CP) is required or not based on the various triggers (for e.g. NVLOG being full, timer expiry, running out of buffers in system memory etc.). Accordingly, when the hosting storage node which is one of the plurality of storage controller devices 14(1)-14(n) determines that the time is not ripe to take a CP, then No branch is taken back to step 305 where the hosting storage node keeps receiving subsequent requests for data operations from the plurality of client computing devices 12(1)-12(n). However, when the hosting storage node determines that CP needs to be taken, then the Yes branch is taken to step 345.

In step 345, the hosting storage node commits the dirty data in volatile system memory to the plurality of storage devices 16(1)-16(n) via CP, which makes those NVLOG operations in the NVRAM dispensable, allowing reclaiming that space from the NVRAM and the exemplary flow proceeds to step 305 where the hosting storage node waits for the next data operation sent from the plurality of client computing devices 12(1)-12(n).

Additionally in this example, when the failed hosting storage node has recovered from the service interruption event, the hosting storage node can again start caching the touched data blocks and their corresponding metadata to and from the partner storage node.

Accordingly, as illustrated and described by way of the examples herein, this technology provides method, non-transitory computer readable media and devices for mirroring/caching of filesystem metadata to a non-volatile random-access memory (NVRAM) or other forms of system memory. By caching the metadata block in some form of system memory of the storage controller devices, the technology is able to significantly reduce the period of outage window during which the data blocks are not available to the client computing devices for data operation.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
   caching, by a computing device, local filesystem metadata in a first non-volatile memory (NVM) based on a received data modifying operation, sent to a first storage node comprising the first non-volatile memory (NVM);
   determining, by the computing device, during the caching when there is a service interruption event making a data block present in the first storage node inaccessible, wherein the first storage node fails due to the service interruption event;
   retrieving, by the computing device, a required filesystem metadata block and one or more data operations from a second NVM of a partner storage node when the service interruption event is determined; and
   completing, by the computing device, the received data modifying operation and the retrieved one or more data operations using the required filesystem metadata block from the second NVM, wherein the second NVM is a warmed cache using the retrieved filesystem metadata block.

2. The method as set forth in claim 1 wherein the first NVM comprises a local non-volatile random access memory (NVRAM), or a partner NVRAM or system memory of a partner storage node.

3. The method as set forth in claim 1 further comprising:
   determining, by the computing device, when the local filesystem metadata required for processing the received data modifying operation is present in the first NVM of first storage node;
   obtaining, by the computing device, the local filesystem metadata required to process the received data modifying operation request from a system memory of the first storage node when the determining indicates the local filesystem metadata required to process the received data operation request is absent in the first NVM of the first storage node; and
   caching, by the computing device, the obtained local filesystem metadata block in the first NVM of the first storage node.

4. The method as set forth in claim 1 further comprising:
   determining, by the computing device, when the first NVM of the first storage node and the second NVM of the partner storage node reaching a threshold memory size due to the received data modifying operation; and
   transferring, by the computing device, data in the first NVM of the first storage node and the second NVM of the partner storage node that has exceeded the threshold from to a memory location on one of a plurality of storage devices.

5. The method as set forth in claim 1 wherein the first and the second NVM is a non-volatile random access memory.

6. The method as set forth in claim 1 wherein the failed first storage node continuously writes the required filesystem metadata block and the one or more data operations in the second NVM of the partner storage node prior to failing due to the service interruption event.

7. A non-transitory computer readable medium having stored thereon instructions for mirroring metadata to a partner non-volatile memory (NVM) comprising executable code which when executed by a processor, causes the processor to:
   cache local filesystem metadata in a first non-volatile memory (NVM) based on a received data modifying operation, sent to a first storage node comprising the first non-volatile memory (NVM);
   determine during the caching when there is a service interruption event making a data block present in the first storage node inaccessible, wherein the first storage node fails due to the service interruption event;
   retrieve a required filesystem metadata block and one or more data operations from a second NVM of a partner storage node when the service interruption event is determined; and
   complete the received data modifying operation and the retrieved one or more data operations using the required filesystem metadata block from the second NVM, wherein the second NVM is a warmed cache using the retrieved filesystem metadata block.

8. The medium as set forth in claim 7 wherein the first NVM comprises a local non-volatile random access memory (NVRAM), or a partner NVRAM or system memory of a partner storage node.

9. The medium as set forth in claim 7 further comprising:
   determine when the local filesystem metadata required for processing the received data modifying operation is present in the first NVM of first storage node;
   obtain the local filesystem metadata required to process the received data modifying operation request from a system memory of the first storage node when the determining indicates the local filesystem metadata required to process the received data operation request is absent in the first NVM of the first storage node; and
   cache the obtained local filesystem metadata block in the first NVM of the first storage node.

10. The medium as set forth in claim 7 further comprising:
    determine when the first NVM of the first storage node and the second NVM of the partner storage node reaching a threshold memory size due to the received data modifying operation; and
    transfer data in the first NVM of the first storage node and the second NVM of the partner storage node that has exceeded the threshold to a memory location on one of a plurality of storage devices.

11. The medium as set forth in claim 7 wherein the first and the second NVM is a non-volatile random access memory.

12. The medium as set forth in claim 7 wherein the failed first storage node continuously writes the required filesystem metadata block and the one or more data operations in the second NVM of the partner storage node prior to failing due to the service interruption event.

13. A computing device comprising:
   a processor;
   a memory coupled to the processor which is configured to be capable of executing programmed instructions comprising and stored in the memory to:
   cache a local filesystem metadata in a first non-volatile memory (NVM) based on a received data modifying operation, sent to a first storage node comprising the first non-volatile memory (NVM);
   determine during the caching when there is a service interruption event making a data block present in the first storage node inaccessible, wherein the first storage node fails due to the service interruption event;
   retrieve a required filesystem metadata block and one or more data operations from a second NVM of a partner storage node when the service interruption event is determined; and
   complete the received data modifying operation and the retrieved one or more data operations using the required filesystem metadata block from the second NVM, wherein the second NVM is a warmed cache using the retrieved filesystem metadata block.

14. The device as set forth in claim 13 wherein the first NVM comprises a local non-volatile random access memory (NVRAM), or a partner NVRAM or system memory of a partner storage node.

15. The device as set forth in claim 13 wherein the processor coupled to the memory is further configured to be capable of executing at least one additional programmed instruction comprising and stored in the memory to:
   determine when the local filesystem metadata required for processing the received data modifying operation is present in the first NVM of first storage node;
   obtain the local filesystem metadata required to process the received data modifying operation request from a system memory of the first storage node when the determining indicates the local filesystem metadata required to process the received data operation request is absent in the first NVM system memory of the first storage node; and
   cache the obtained local filesystem metadata block in the first NVM of the first storage node.

16. The device as set forth in claim 15 wherein the processor coupled to the memory is further configured to be capable of executing at least one additional programmed instruction comprising and stored in the memory to:
   determine when the first NVM of the first storage node and the second NVM of the partner storage node reaching a threshold memory size due to the received data modifying operation; and
   transfer data in the first NVM of the first storage node and the second NVM of the partner storage node that has exceeded the threshold to a memory location on one of a plurality of storage devices.

17. The device as set forth in claim 13 wherein the first and the second NVM is a non-volatile random access memory.

18. The device as set forth in claim 13 wherein the failed first storage node continuously writes the required filesystem metadata block and the one or more data operations in the second NVM of the partner storage node prior to failing due to the service interruption event.

* * * * *